Jan. 12, 1926.
E. H. FREEMAN
INTEGRATING METER
Filed April 15, 1920
1,568,970
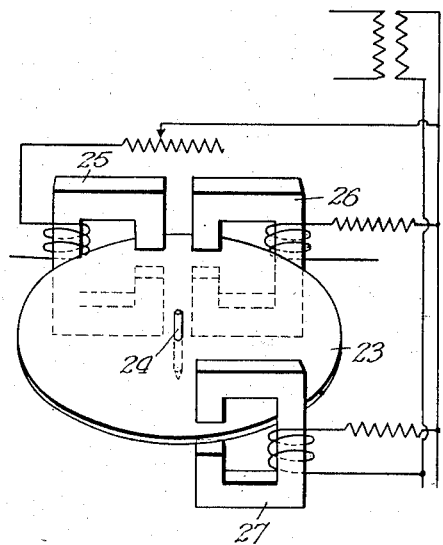
Inventor
Ernest H. Freeman
By Charles M. Nissen Atty.

Patented Jan. 12, 1926.

1,568,970

UNITED STATES PATENT OFFICE.

ERNEST H. FREEMAN, OF WILMETTE, ILLINOIS.

INTEGRATING METER.

Application filed April 15, 1920. Serial No. 374,076.

*To all whom it may concern:*

Be it known that I, ERNEST H. FREEMAN, a citizen of the United States, residing in Wilmette, in the county of Cook and State of Illinois, have invented certain new and useful Improvements in Integrating Meters, of which the following is a specification.

This invention has for its object the provision of devices of the class named which shall be of improved construction and operation.

The invention is exemplified in the combination and arrangement of parts shown in the accompanying drawing and described in the following specification, and it is more particularly pointed out in the appended claims.

In the drawing the figure is a diagrammatic perspective view of one embodiment of the invention.

In general a meter constructed in accordance with the present invention comprises a rotatable element in which two or more torques are developed, one or more producing rotation, and one or more retarding rotation. These torques are produced electromagnetically and the number of revolutions of the rotatable element is an integration with respect to time of some function of the conductances or of the admittances of the electrical circuits in which the meter is connected. Since the conductance or the admittance of an electric circuit is the reciprocal of the resistance or impedance respectively of the circuit, it will be understood that where functions of conductance or admittance is referred to, corresponding relations may be expressed in terms of resistance or impedance by simple substitution.

The induction type of meter may also be used to integrate functions of admittances or conductances. This type is shown in Fig. 3 in which a rotatable disc 23 is mounted on a shaft 24 and rotates between the poles of electro-magnets 25, 26 and 27. The torque $T_a$ producing rotation is, with sine wave currents through the windings of the electro-magnets practically $$T_a = K_{16} I_1 I_2 \sin \Theta \quad (22)$$

in which $K_{16}$ is a constant, $I_1$ the current through the circuit connected with the magnet 25, $I_2$ the current through the circuit of the magnet 26, and $\Theta$ the phase difference between $I_1$ and $I_2$. If $V_1$ and $Y_1$ are voltage and admittance respectively in the circuit of the magnet 25 and $V_2$ and $Y_2$ the voltage and admittance of the circuit of the magnet 26, then $$I_1 = Y_1 V_1 \quad (23)$$

and $$I_2 = Y_2 V_2 \quad (24)$$

Therefore $$T_a = K_{16} V_1 V_2 Y_1 Y_2 \sin \Theta \quad (25)$$

The retarding torque $T_r$ is produced by friction and by motion of the disc through the fields of the electro-magnets. If practically all of the retarding torque is developed from the electro-magnet 27 then $$T_r = K_{17} \omega Y^2_3 V^2_3 \quad (26)$$

in which $K_{17}$ is a constant, $\omega$ the angular velocity, $Y_3$ the admittance in the circuit of the magnet 27 and $V_3$ the voltage in the circuit of the magnet 27. By equating the two torques and assuming that $V_1$, $V_2$ and $V_3$ are constant, or that $V_1$, $V_2$ and $V_3$ are equal to one another, the equation of the meter becomes $$\int \frac{Y_1 Y_2}{Y^2_3} \sin \Theta \, dt = \int \omega \, dt = K_{18} N \quad (27)$$

If $\sin \Theta$ is constant, it is apparent from the above equation that it is possible to obtain integrations of the admittance of any one of the magnet circuits, if the other two remain constant.

Errors due to friction have been neglected but these can be more or less completely corrected by special circuits. It is understood that the meters are provided with any usual form of counter for registering the number of revolutions in a period of time. Such a counter is shown at 28 in Fig. 1 of the drawing.

I claim:

1. A meter of the induction motor type comprising a plurality of electro-magnets all of which are provided with cores having sufficient cross-sectional area throughout their length to permit operation thereof at less than magnetic saturation during normal fluctuations of the current in the respective coils, and a rotor arranged to move through the fields of said electro-magnets, the windings of said electro-magnets being connected in multiple to a common source of alternating electro-motive force so as to energize said magnets to produce both driving and retarding torques on said rotor, the circuit of one of said magnets being variable to change the admittance thereof thus varying the speed of said rotor and causing said meter to integrate a function of said circuit substantially independently of variations in voltage of said source.

2. A meter of the induction motor type having a conductor disc rotor, a plurality of magnets having their poles disposed on opposite sides of said disc at different positions thereon all of said magnets having cores of sufficient cross-sectional area throughout their length to permit operation thereof at less than magnetic saturation during normal fluctuations of the current in the respective coils, one of said magnets being constructed and wound to produce a relatively strong magnetic field so as to exert a predominating retarding torque on said disc, the winding circuits of said magnets being connected in multiple to a common source of electromotive force, and means for varying the admittance of the circuit of one of said magnets to vary the speed of said meter so that said meter integrates a function of said circuit.

3. An integrating meter comprising a rotary member, electro-magnetic means for imparting an accelerating torque to said member, electro-magnetic means for exerting a retarding torque on said member, all of said electro-magnetic means having the cores thereof of sufficient cross-sectional area throughout their lengths to permit operation thereof at a flux density less than saturation for normal current values for said meter, the electric circuit of one of said electro-magnetic means having a changeable admittance for changing the speed of rotation of said rotary member, and means for impressing the same electro-motive force on the electric circuits of all of said electro-magnetic means so that variations in said accelerating and retarding torques due to fluctuations in said electro-motive force will substantially counteract one another, said instrument being calibrated to integrate admittance of said changeable electric circuit directly.

In testimony whereof I have signed my name to this specification on this 13th day of April, A. D. 1920.

ERNEST H. FREEMAN.